United States Patent
Berthelot (10) Patent No.: US 9,638,933 B2
(45) Date of Patent: May 2, 2017

(54) NOSE SUPPORT ASSEMBLY AND CORRESPONDING SPECTACLE FRAME

(71) Applicant: ESSILOR INTERNATIONAL (COMPAGNIE GENERALE D'OPTIQUE), Charenton-le-Pont (FR)

(72) Inventor: Jean-Luc Berthelot, Migron (FR)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 0 days.

(21) Appl. No.: 14/780,851

(22) PCT Filed: Apr. 18, 2014

(86) PCT No.: PCT/EP2014/057994
§ 371 (c)(1),
(2) Date: Sep. 28, 2015

(87) PCT Pub. No.: WO2014/170477
PCT Pub. Date: Oct. 23, 2014

(65) Prior Publication Data
US 2016/0054583 A1   Feb. 25, 2016

(30) Foreign Application Priority Data
Apr. 19, 2013  (FR) ..................................... 13 00945

(51) Int. Cl.
*G02C 1/00* (2006.01)
*G02C 5/12* (2006.01)

(52) U.S. Cl.
CPC ............. *G02C 5/122* (2013.01); *G02C 5/126* (2013.01); *G02C 2200/16* (2013.01)

(58) Field of Classification Search
CPC .................................... G02C 1/00; G02C 3/00
(Continued)

(56) References Cited

U.S. PATENT DOCUMENTS 3,431,045 A * 3/1969 Dietrich .................. G02C 5/12
351/136
4,040,729 A    8/1977 Winkler et al.
(Continued)

FOREIGN PATENT DOCUMENTS

CN    2004155004 A    2/2005
CN     201518077 U    6/2010
(Continued)

OTHER PUBLICATIONS

International Search Report, dated Jul. 7, 2014, from corresponding PCT Application.

(Continued)

Primary Examiner — Hung Dang
(74) Attorney, Agent, or Firm — Young & Thompson (57) ABSTRACT

A nose support assembly for a spectacle frame, includes two nose support elements (3), known as nose pads, and, for each nose pad, a mounting element (2) for the nose pad, known as the nose pad holder. Each nose pad (3) and the corresponding nose pad holder (2) have connecting elements (1) for connecting one to the other, the connecting elements being designed to allow the nose pad (3) to move angularly with respect to the nose pad holder (2). A frame equipped with such a nose support assembly is also described.

20 Claims, 8 Drawing Sheets

(58) Field of Classification Search
USPC .. 351/137, 136, 138, 76, 77, 78, 79, 80, 81, 351/88
See application file for complete search history.

(56) References Cited

U.S. PATENT DOCUMENTS

| | | |
|---|---|---|
| 4,205,905 A | 6/1980 | Abel et al. |
| 4,681,411 A | 7/1987 | Taddei |
| 5,351,099 A | 9/1994 | Winkler et al. |
| 2008/0068558 A1 | 3/2008 | Pan |
| 2009/0079933 A1 | 3/2009 | Kwan |
| 2012/0206690 A1 | 8/2012 | Chen |
| 2012/0300169 A1 | 11/2012 | Jackson et al. |

FOREIGN PATENT DOCUMENTS

| | | |
|---|---|---|
| CN | 102109683 A | 6/2011 |
| CN | 202939372 U | 5/2013 |
| DE | 8815489 U1 | 4/1990 |
| EP | 0 179 187 A2 | 4/1986 |
| EP | 579373 A1 | 1/1994 |
| EP | 633487 A1 | 1/1995 |
| EP | 742913 A1 | 11/1996 |
| EP | 1051654 A1 | 11/2000 |
| EP | 1903372 A1 | 3/2008 |
| EP | 2862020 A0 | 4/2015 |
| FR | 1 167 045 A | 11/1958 |
| FR | 2 861 189 A1 | 5/2005 |
| GB | 2239958 A | 7/1991 |
| GB | 2267358 A | 12/1993 |
| WO | 95/21399 A1 | 8/1995 |
| WO | 99/36827 A1 | 7/1999 |
| WO | 2005/038510 A1 | 4/2005 |
| WO | 2007/034520 A1 | 3/2007 |
| WO | 2010/057883 A1 | 5/2010 |
| WO | 2013/186731 A1 | 12/2013 |

OTHER PUBLICATIONS

Chinese Office Action dated May 19, 2015, in corresponding Chinese Application, English translation provided.
French Search Report dated Dec. 13, 2013, in corresponding French application.

* cited by examiner

NOSE SUPPORT ASSEMBLY AND CORRESPONDING SPECTACLE FRAME

The present invention relates in general to nose support assemblies comprising nose pads and corresponding mounting elements for spectacle frames.

An optical or sunshade full-rimmed or half-rimmed frame, made of metal and/or plastics material, and also what is known as a rimless frame, that is to say one without rims, has a part known as the frame nosepiece, which connects the two lens locations and comprises two nose pads that are fixed to nose pad holders and are intended to rest against the opposite sides of the wearer's nose.

Depending on the shape of the wearer's nose, and in particular for a wearer who has a flat nose, it is possible for the orientation of the nose pads to be poorly suited to the wearer's nose such that said nose pads do not provide the wearer with the expected support comfort.

The solutions set out in documents FR1167045, WO2007034520, WO2010/057883, DE8815489, U.S. Pat. No. 4,681,411, FR2861189, EP0179187 and US20090079933 are complex to implement and/or have a large size.

The present invention aims to solve all or some of the problems described above.

To this end, the subject of the invention is a nose support assembly for a spectacle frame, comprising:
- two nose support elements, known as nose pads, and
- for each nose pad, a mounting element for said nose pad, known as the nose pad holder, which comprises an arm for connecting to the frame, each nose pad and the corresponding nose pad holder having connecting means for connecting one to the other, said connecting means being designed to allow the nose pad to move angularly with respect to the nose pad holder, the connecting means between the nose pad and the nose pad holder comprising a male element and a female element that forms a housing for receiving the male element;

one of said male element and the receiving housing being carried by the nose pad and the other being carried by the nose pad holder;

the male element being provided with stop means that extend predominantly along an axis, known as the Z axis, which is approximately at right angles to an axis, known as the X axis, which is parallel to the normal to the nose support face of the nose pad, and at right angles to an axis, known as the Y axis, which is parallel to the main axis along which the arm of the nose pad holder extends.

Such an assembly of nose pads and nose pad holders for a spectacle frame provides improved nose support comfort for wearers, in particular for wearers having different nose shapes and in particular for wearers who have a flat nose.

By virtue of such mobility of the nose pads, the positioning of the frame, in particular in the region of the nose pads, can be suited correctly to the shape, for example a flat shape, of the wearer's nose, in particular for Afro-Caribbean or Asian wearers.

Such a design of the nose support assembly also allows the nose pads to be adapted to the natural asymmetry of a wearer's nose.

The mobility of the nose pads is also advantageous for spectacles having progressive lenses, for which adjustment which is as precise as possible is required. This adjustment is enabled by the use of these nose pads under conditions of precision which are more reliable than those of the prior art.

The arrangement of said stop means of said male element mainly along the Z axis makes it possible to retain a limited size of the nose pad/nose pad holder assembly.

According to one advantageous feature of the invention, said male element, known as a ball, has a curved surface, preferably having an at least partially spherical overall shape.

According to one advantageous feature of the invention, said stop means provided on said male element are formed from a plurality of separate parts that are distributed such that the imaginary envelope that surrounds the set of said parts extends mainly along said Z axis.

According to one advantageous feature of the invention, said stop means of said male element are designed to limit the angular travel of the nose pad with respect to the nose pad holder about the Z axis, preferably in a range of travel of around 45°.

According to one advantageous feature of the invention, said stop means of said male element are also designed to limit the angular travel of the nose pad with respect to the nose pad holder about the Y axis, preferably in a range of travel of around 45°.

According to one advantageous feature of the invention, said stop means of said male element are designed to also limit the angular travel of the nose pad with respect to the nose pad holder about the X axis, preferably in a range of travel of around 15°.

According to one advantageous feature of the invention, said stop means of said male element are designed to prevent the angular travel of the nose pad with respect to the nose pad holder about the X axis.

According to one advantageous feature of the invention, said stop means of said male element extend along a length greater than the diameter, or than the size along the Z axis of said male element, on either side of said male element.

According to one advantageous feature of the invention, said stop means of said male element have two opposite faces which extend mainly along the Z axis, and which form opposite stop surfaces, one of which limits the relative movement of the nose pad about the Z axis with respect to the nose pad holder in one direction and the other of which limits the relative movement of the nose pad with respect to the nose pad holder about the Z axis in the other direction.

According to one advantageous feature of the invention, said stop means of the ball comprise a part having the overall shape of a cylinder sector having an axis passing approximately through the centre of the sphere in which said connecting ball is inscribed, said cylinder sector projecting from said connecting ball.

According to one advantageous feature of the invention, said male element is provided on the nose pad holder and the receiving housing is provided on the nose pad.

According to one advantageous feature of the invention, the receiving housing is provided on that face of the nose pad that is opposite the nose support face, and has a groove having an axis approximately parallel to the Y axis for the insertion of a portion of the arm of the nose pad holder.

According to one advantageous feature of the invention, the receiving housing is provided on that face of the nose pad that is opposite the nose support face, and has a groove having an axis approximately parallel to the Z axis so as to allow parts in relief of the receiving housing to form stops complementary to said stop means of said male element.

According to one advantageous feature of the invention, the nose pad has, on the side of that face, known as the rear face, of the nose pad that is opposite the nose support face, a part in the form of an arch which bounds, with the rear face of the nose pad, said receiving housing, and a groove is provided in a portion of said arch in a direction approximately parallel to the Z axis and has a length greater than the length of the stop means of said male element so that said stop means of said male element can be guided during a relative movement about the Y axis of the nose pad with respect to the nose pad holder.

According to one advantageous feature of the invention, each nose pad comprises a part, known as the fitting part, which is made of an elastically deformable material, such as polycarbonate, for force-fitting said male element into the receiving housing, and a part, known as the nose support part, which is intended to rest on a side of the wearer's nose, said part being made of a material having a hardness less than that of the fitting part.

According to one advantageous feature of the invention, the nose support face of each nose pad comprises a straight upper part and a curved lower part that extends said straight part.

The invention also relates to a spectacle frame having a face which comprises two lens locations and a frame nosepiece that connects the two lens locations, said frame also having a nose support assembly which has two nose support elements, known as nose pads, and, for each nose pad, a mounting element, fixed to the frame nosepiece, for said nose pad, characterized in that said nose support assembly is as described above.

Advantageously, said connecting means are designed to allow each nose pad to form, with an axis perpendicular to the face of the frame, a splay angle that can vary in the range [1°; 45°].

Advantageously, said connecting means are designed to allow each nose pad to form, with the vertical axis of symmetry of the frame, a frontal angle that can vary in the range [10°; 50°].

The invention will be clearly understood from reading the following description of exemplary embodiments, with reference to the appended drawings, in which.

With reference to the figures and as recalled above, the invention relates to a nose support assembly for a spectacle frame 7 and to a corresponding frame.

Said nose support assembly comprises two nose support elements 3, known as nose pads, and, for each nose pad, a mounting element 2 for said nose pad, known as the nose pad holder 2.

As a reminder, a spectacle frame 7 comprises a face which has two lens locations 71 and temples 72 connected to said face to hold the spectacles 7 in the region of the temples of the wearer's head, resting on the ears or temples.

The lens location corresponds to the location in which the lens, which is or is not corrective, is intended to be fitted in the frame. Thus, this lens location may be bounded by the rim, or half-rim, of a frame in the case of a full-rimmed, or half-rimmed, frame, or by a presentation lens in the case of a rimless frame.

Said face of the frame 7 also comprises a frame nosepiece 70 that connects the two lens locations 71. The frame nosepiece 70 is provided with a nose support assembly comprising two nose pads 3 that are intended to rest against the sides of the wearer's nose in order to ensure the stability of the frame on the wearer's nose. Each of these nose pads 3 is attached to the frame nosepiece 70 by a nose pad holder 2 at one end of an arm 20 of said nose pad holder 2.

The frame may be of various types. In the example illustrated in the figures, the frame 7 is a full-rimmed frame. In this case, and as explained in detail below, the lens locations are bounded by two rims 70 which are connected together by a frame nosepiece 70. Alternatively, said frame may be half-rimmed.

The frame may also be rimless. In the case of a rimless frame, the nose pad holders are fixed to an element, known as the central bridge, that forms the frame nosepiece which connects the lenses together. By default, a rimless frame is equipped with presentation lenses which realize the location of lenses adapted to the wearer.

In other words, the frame nosepiece can be formed by the facing portions of the rims of the frame and the part for connecting said rims together, or by a central bridge fixed directly to the frame lenses.

The two rims, or the lenses in the case of a rimless frame, and the nosepiece of the frame which connects the two rims or the two lenses define the face of the frame.

The spectacle frame is fitted on the wearer's face by the temples 72 of the frame 7 and by the nose pads 3.

In the example illustrated in the figures, each nose pad 3 and associated nose pad holder 2 have connecting means 1 for connecting one to the other. Said connecting means are designed to afford one or more possibilities of angular movement of the nose pad 3 with respect to the nose pad holder 2.

In other words, the connection between each pad and its associated nose pad holder allows each pad to pivot about at least one axis. According to some embodiments, said connecting means form a ball-joint connection between the nose pad and its nose pad holder.

In the following, the X, Y and Z axes are defined as follows. The Y axis corresponds generally to the axis of the arm of the nose pad holder, the end of which is connected to the frame. When the arm has portions which extend in different orientations, the Y axis is defined as the axis of that portion of the arm that extends mainly in a manner parallel to the vertical axis of symmetry of the frame. This vertical axis of symmetry also corresponds to the axis of symmetry of the frame which is contained in the face plane of the frame. This axis of symmetry passes between the lens locations.

The X axis is an axis parallel to the normal to the nose support face 302 of the nose pad, passing through the geometric centre of the nose pad 3. The nose support face 302 is that face of the nose pad that is opposite the face of the nose pad, known as the rear face 304, on the side of which said connecting means 1 for connecting the nose pad and nose pad holder are located. The Z axis corresponds to an axis which is at right angles to the Y axis and to the X axis.

The wearer's nose is characterized by two angles, known respectively as the frontal angle and the splay angle. For a wearer who is holding his head straight, the frontal angle is the angle between the vertical and one side of the wearer's nose as seen from the front. The splay angle is the angle between the horizontal and one side of the wearer's nose as seen from above.

For proper adaptation of the frame to the morphology of the wearer, these angles have to be found on the frame.

Figure 1:
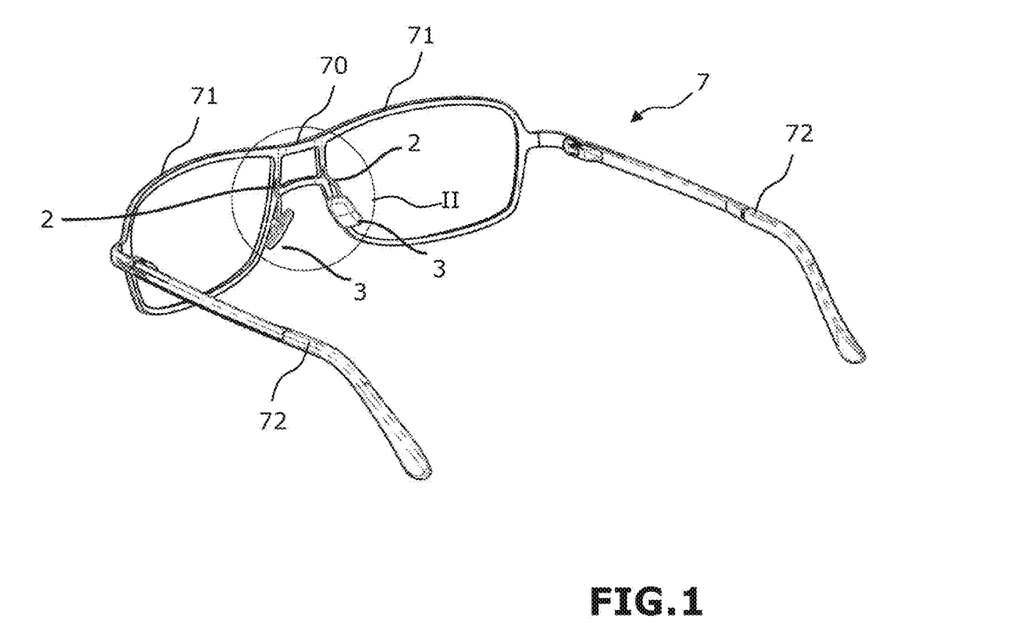
FIG. 1 is a perspective view of a spectacle frame provided with an assembly of nose pads and nose pad holders corresponding to a first embodiment of the invention.
Figure 2:
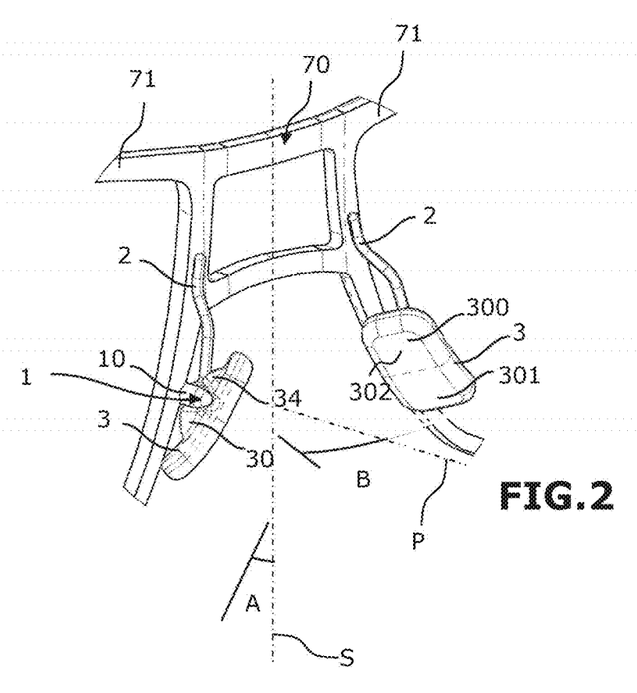
FIG. 2 is a detail view of the area referenced II of the frame from FIG. 1.
Figure 3:
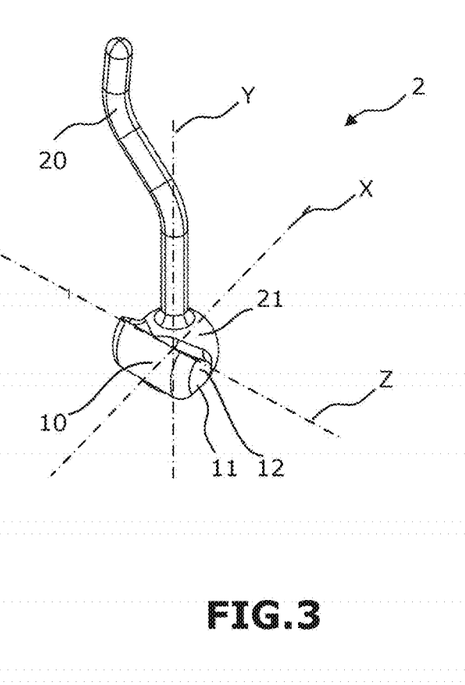
FIG. 3 is a perspective view of a nose pad holder of the frame from FIG. 1.

Thus, when the frame is viewed from the front, the frame has a frontal angle A defined between the plane tangential to one of the nose pads and the axis S of symmetry of the face of the frame (FIG. 2). Preferably, said tangential plane is drawn at the area of the nose pad that is intended to rest against the wearer's nose. The vertical axis of symmetry S of the frame 7 corresponds to the axis of symmetry of the frame which is contained in the face plane of the frame. This axis passes between the lens locations. When the frame is viewed from the front and when the wearer holds his head straight, the frontal angle A can also be defined as being the angle between the mean plane of a nose pad 3 and the vertical which passes through the middle of the face of the frame.

When the frame is viewed from above, the frame has a splay angle B defined between the plane tangential to one of said nose support elements and a perpendicular P to the mean plane of the face of the spectacle frame (see FIG. 2).

Advantageously, by virtue of the mobility of each nose pad 3, said frontal angle A of a nose pad of the nose support assembly according to the invention can vary in a range [10°; 50°]. Similarly, said splay angle B of a nose pad of the nose support assembly according to the invention can vary in the range [1° and 45°].

Depending on the shape of the wearer's nose, the frontal angle, and also the splay angle formed by a nose pad, may be different from the frontal angle, or splay angle, respectively, formed by the other nose pad.

The angular mobility of each nose pad 3 with respect to the corresponding nose pad holder 2 allows the nose pad 3 to assume an orientation in which the frontal angle A, and the splay angle B, respectively, of the frame in the region of each nose pad 3 is adapted to the frontal angle, and splay angle, respectively, of the corresponding side of the wearer's nose. In other words, the mobility of the nose pad makes it possible to modify the frontal angle A and splay angle B associated with each nose pad, thereby making it possible for each nose pad to automatically orient itself with the corresponding frontal angle and splay angle of the wearer's nose when the wearer is provided with such a frame.

In the example illustrated in the figures, said connecting means 1 for connecting each nose pad and its nose pad holder comprise a male part 21 provided on the nose pad holder 2 and a female part 30 provided on the nose pad 3.

Each nose pad is made of an elastically deformable material, such as polycarbonate, making it possible to force fit the male part 21 into the female part 30 of the connecting means for connecting the nose pad 3 to the nose pad holder 2.

According to one embodiment of the invention, each nose pad is made of two materials. In particular, that part of each nose pad, known as the fitting part, that makes it possible to force fit the male part into the female part of the connecting means for connecting the nose pad to the nose pad holder is made of an elastically deformable material, such as polycarbonate, and another part, known as the nose support part, of the nose pad is made of a material having a hardness less than that of the fitting part in order to rest in a flexible manner against one side of the wearer's nose.

In the example illustrated in the figures, said male part 21 of the nose pad holder 2 has a surface having an at least partially spherical overall shape, known as the connecting ball. This ball may be solid, hollowed out or formed from a plurality of separate elements such as needles.

This ball 21 is located at the end of an arm 20, the other end of which is fixed, for example welded, to the frame nosepiece and/or to the arm 20 of the other nose pad holder. Said ball 21 is provided with stop means 10 which extend predominantly along an axis, known as the Z axis, which is approximately at right angles to the X axis and at right angles to the Y axis. Of course, said stop means 10 cooperate with complementary stop means 30, 34 provided on that element of the nose pad/nose pad holder assembly which does not carry the ball 21.

Figure 4:
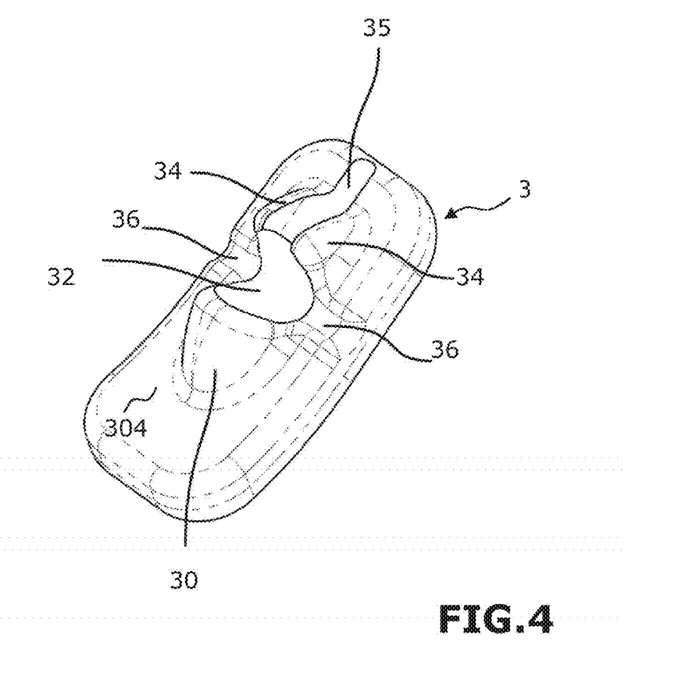
FIG. 4 is a perspective view of a nose pad of the frame from FIG. 1.
Figure 14:
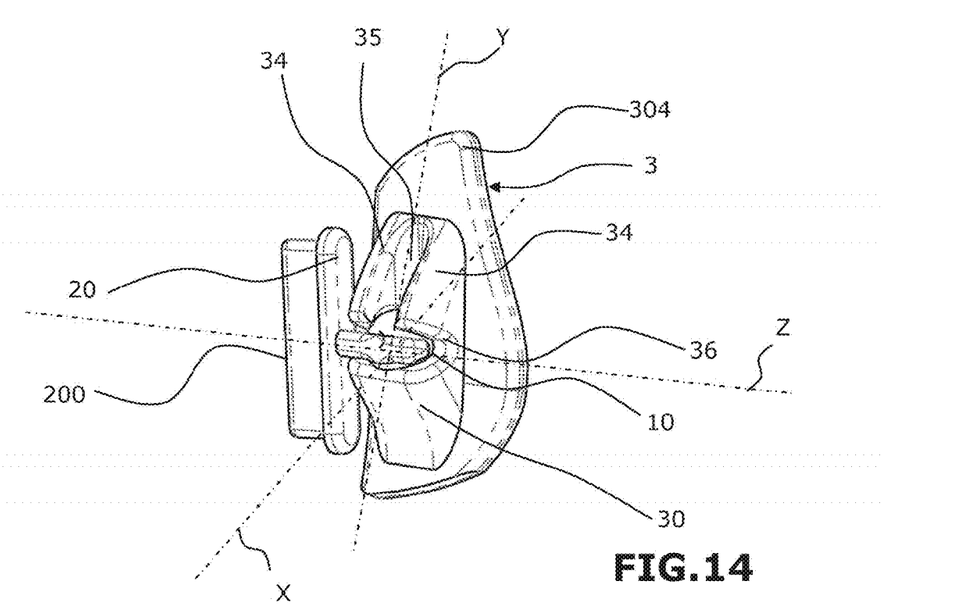
FIG. 14 is a perspective view of a nose pad and nose pad holder assembly in the assembled state according to another embodiment of the invention.

As illustrated more particularly in the examples in FIGS. 4 and 14, the female part 30 of said connecting means 1 comprises a portion in relief that is provided on that face 304 of the nose pad 3 that is opposite the nose support face. This portion in relief bounds, by way of its projecting areas 34, 30, a receiving housing 32 for the connecting ball 21, on that side of the ball that is opposite the stop means 10 carried by said connecting ball.

The receiving housing 32 has a groove 35 having an axis approximately parallel to the Y axis for the insertion of a portion of the arm 20 of the nose pad holder 2. This groove 35 is bounded between the two projecting areas 34 of the rear face of the nose pad 3 and allows the insertion of a portion of the arm 20 of the nose pad holder 2. The areas 34 which bound the groove 35 and/or the opposite longitudinal faces of said stop means 10, as explained in detail below, form stop means that limit or prevent the pivoting of the nose pad 3 about the X axis.

The receiving housing 32 also has a groove 36 having an axis approximately parallel to the Z axis for the passage of said stop means 10 of the ball 21. The parts in relief 34, 30 of the receiving housing 32 extend on either side of the groove 36 and form complementary stops to said stop means 10 of the ball 21. In particular, said groove 36 is bounded between said parts in relief 34, 30.

Figure 15:
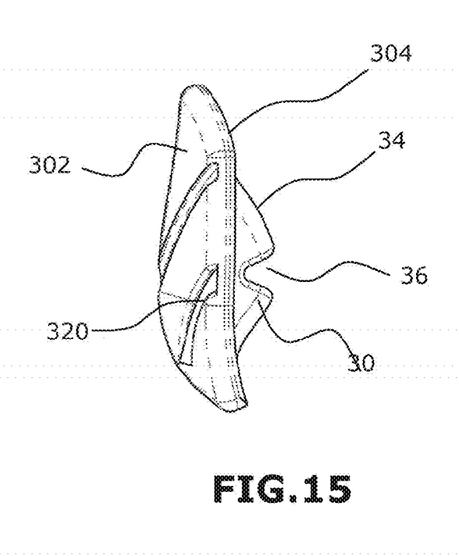
FIG. 15 is a perspective view of the nose pad of the embodiment in FIG. 14.
Figure 16:
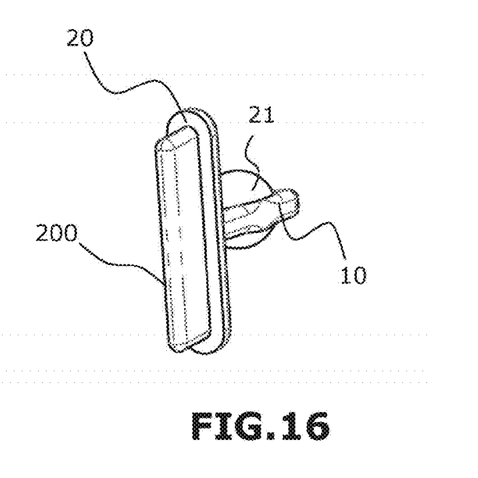
FIG. 16 is a perspective view of the nose pad holder of the embodiment in FIG. 14.

In the particular case of FIG. 14, it will be noted that the arm 20 is connected directly to the element which is elongate along the Z axis and forms said stop means 10 of the ball 21. Said arm 20 is also provided with means 200 for attaching to the frame that are intended to cooperate with complementary means provided on the frame (not shown). In addition, in this embodiment that is illustrated in FIGS. 14 to 16, grooves 320 are provided in the nose support face 302 so as to favour the evacuation of sweat.

The connection thus formed between each nose pad and its nose pad holder has the advantage of allowing each nose pad to assume a position that is optimally adapted to the frontal angle and the splay angle on the corresponding side of the wearer's nose. The stop means 10 of the ball 21 form a male indexing element while the receiving housing 32 forms a female indexing element for positioning the nose pad with respect to the nose pad holder. Angular travels that are authorized by this connection are limited by the stop means 10, as explained in detail below.

In the example illustrated in FIGS. 1 to 10, said stop means 10 comprise a part that is in the overall shape of a cylinder sector having an axis, approximately parallel to the Z axis, that passes through the centre of the sphere corresponding to the ball 21. Said cylinder sector projects from said ball. The axis of said cylinder sector is approximately at right angles to the direction of the portion of the arm 20 attached to the connecting ball 21. In particular, the cylinder sector extends axially on either side of the ball.

The two longitudinal faces 11 of the stop means 10, that is to say the two faces which are parallel to the axis of the cylinder sector, are inclined with respect to one another so as to define the amplitude of travel authorized by the nose pad 3 about the Z axis. The opposite end portions 12 of said cylinder sector, which are located on either side of the ball 21, form means for limiting the angular travel of the nose pad 3 about the Y axis.

As illustrated more particularly in FIG. 2, the nose support face of each nose pad 3 comprises an upper straight part 300 and a lower curved part 301 that extends said straight part. The notions of "lower" and "upper" are defined with reference to the state of the spectacle frame when it is worn by a wearer. In other words, the upper part of the nose pad is closer to that end of the arm of the nose pad holder that is intended to be fixed to the frame than the lower part of the nose pad. In other words, the straight and curved parts are oriented such that the straight part extends closer to the frame nosepiece than the curved part does.

The design of the nose pad in the form of a straight part that is extended by a curved part makes it possible to follow in a suitable manner the curvature of those areas of the nose on which the nose pads are intended to rest. Furthermore, the convex shape of the nose support face of the nose pads makes it possible to prevent them from marking the sides of the wearer's nose.

Figure 5:
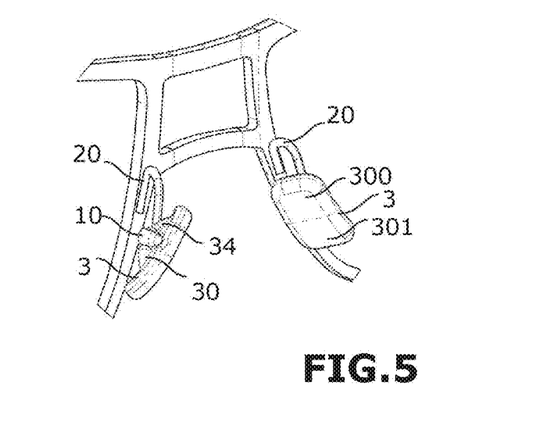
FIG. 5 is a perspective view of a nose pad holder according to one variant embodiment of the invention.
Figure 6:
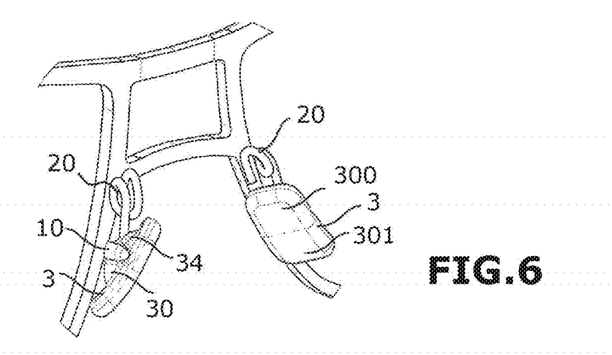
FIG. 6 is a perspective view of a nose pad holder according to another variant embodiment of the invention.
Figure 7:
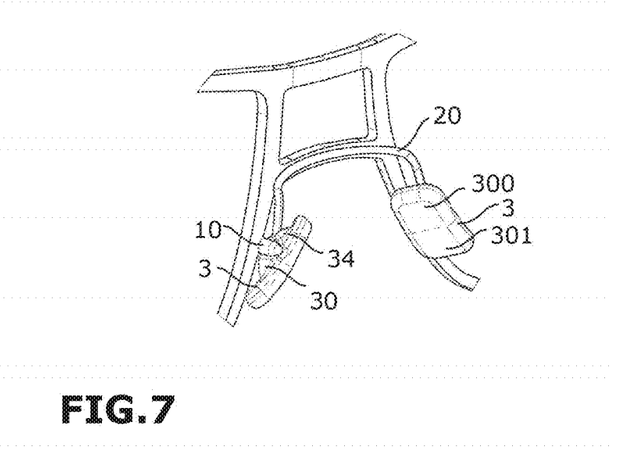
FIG. 7 is a perspective view of a nose pad holder according to another variant embodiment of the invention.
Figure 8:
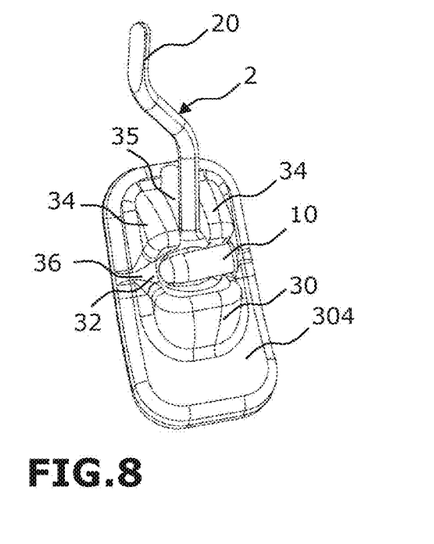
FIG. 8 is a perspective view of a nose pad and nose pad holder assembly in the assembled state, similar to those shown in FIG. 2.
Figure 9:
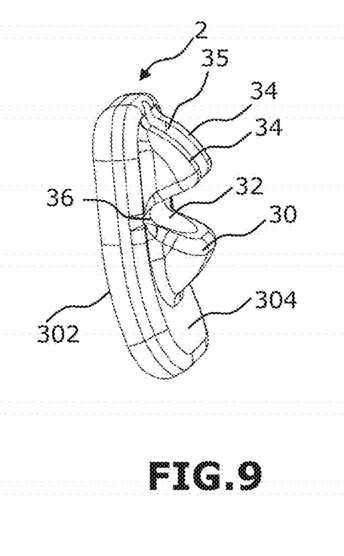
FIG. 9 is a perspective view of the nose pad of the assembly from FIG. 8.
Figure 10:
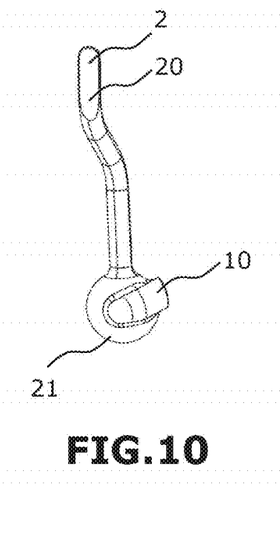
FIG. 10 is a perspective view of the nose pad holder of the assembly from FIG. 8.

The arm 20 of each nose pad holder may have various shapes. Specifically, said arm may comprises a portion that is bent in the shape of a U, as illustrated in FIG. 5, or a portion having a double loop, as illustrated in FIG. 6. It is also possible to provide for the arms 20 of the two nose pad holders to be connected together or to be formed from a single piece, as illustrated in FIG. 7. More generally, it is possible to provide for the two nose pad holders to comprise a common part.

Figure 11:
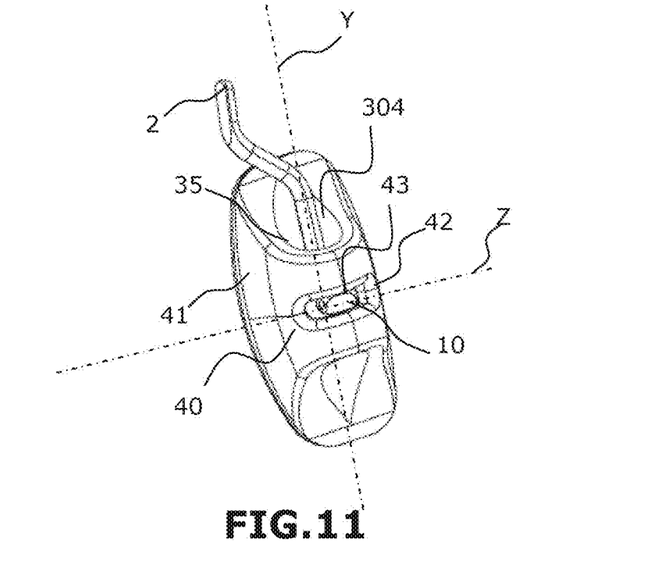
FIG. 11 is a perspective view of a nose pad and nose pad holder assembly in the assembled state according to another variant embodiment of the invention.
Figure 12:
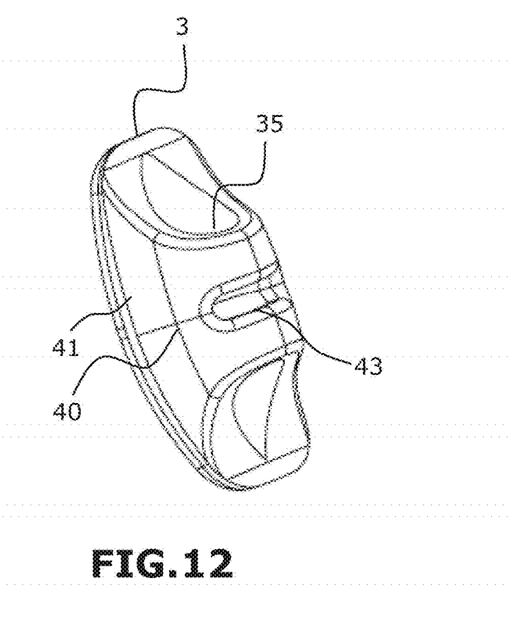
FIG. 12 is a perspective view of the nose pad of the embodiment in FIG. 11.
Figure 13:
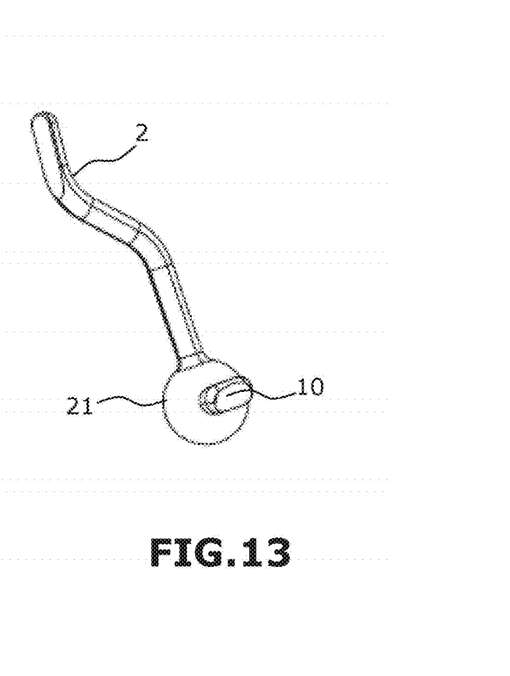
FIG. 13 is a perspective view of the nose pad holder of the embodiment in FIG. 11.

According to the embodiment illustrated in FIGS. 11 to 13, the nose pad 3 has, on opposite side from its nose support face 302, a part in the form of an arch 40 which bounds a housing into which the connecting ball 21 is inserted. The arch 40 has two opposite feet located on the two opposite sides, considered along the Z axis, of the nose pad 3, and thus bounds an introduction passage 35 for the nose pad holder 2. The axis of said passage 35 is approximately parallel to the Y axis.

A through-groove 43 is provided along a part of the arch 40, preferably in an area centred around the top of the arch 40 such that the stop means 10 carried by the ball 21 can be guided. This through-groove 43 extends in a direction approximately at right angles to the axis of the passage 35 in the arch, that is to say extends approximately along the Z axis.

The arch thus extends on the side of the rear face 304 of the nose pad from one edge of the nose pad to the other, thereby making it possible to surround the connecting ball and thus to limit the risk of accidental detachment of the nose pad holder.

The through-groove 43 extends along a length greater than that of said stop means 10 of the ball so as to allow a relative movement of the stop 10 inside the groove 43 and thus to allow relative mobility of the nose pad and of the nose pad holder by pivoting about the Y axis.

The through-groove 43 of the arch 40 of the nose pad 3 and the stop 10 of the ball 21 are designed such that the frontal angle associated with the nose pad can vary over a range of 40° and the splay angle associated with the nose pad can vary over a range of 45°.

In the example illustrated in FIGS. 11 to 13, the passage 35 bounded by the arch is a through-passage. Alternatively, it is also possible to provide for the mouth, defined between the two feet 41, 42 of the arch 40, on the opposite side from the introduction opening for the ball 21 of the nose pad holder 2, to be closed in the manner of a blind hole.

In the examples illustrated in the figures, said stop means 10 of the ball 21 also limit the angular travel of the nose pad 3 with respect to the nose pad holder 2 about the X axis. Alternatively, it is possible to provide for said stop means 10 or other stop means to prevent the relative travel between the nose pad 3 and the nose pad holder 2 about the X axis, The present invention is in no way limited to the embodiments described and shown, and those skilled in the art will be able to make modifications thereto without departing from the scope of the invention.

The invention claimed is:

1. Nose support assembly for spectacle frame (7), comprising:
    two nose support elements (3), known as nose pads, and
    for each nose pad (3), a mounting element (2) for said nose pad, known as the nose pad holder, which comprises an arm (20) for connecting to the frame,
    each nose pad (3) and the corresponding nose pad holder (2) having connecting means (1) for connecting one to the other, said connecting means being designed to allow the nose pad (3) to move angularly with respect to the nose pad holder (2), the connecting means between the nose pad (3) and the nose pad holder (2) comprising a male element (21) and a female element that forms a housing (32) for receiving the male element;
    one of said male element (21) and the receiving housing (32) being carried by the nose pad (3) and the other being carried by the nose pad holder (2);
    the male element (21) being provided with stop means (10) that extend predominantly along an axis, known as the Z axis, which is approximately at right angles to an axis, known as the X axis, which is parallel to the normal to the nose support face (302) of the nose pad (3), and at right angles to an axis, known as the Y axis, which is parallel to the main axis along which the arm (20) of the nose pad holder (2) extends.

2. Assembly according to claim 1, wherein said male element, known as a ball (21), has a curved surface, preferably having an at least partially spherical overall shape.

3. Assembly according to claim 1, wherein said stop means (10) provided on said male element (21) are formed from a plurality of separate parts that are distributed such that the imaginary envelope that surrounds the set of said parts extends mainly along said Z axis.

4. Assembly according to claim 1, wherein said stop means (10) of said male element (21) are designed to limit the angular travel of the nose pad (3) with respect to the nose pad holder (2) about the Z axis, preferably in a range of travel of around 45°.

5. Assembly according to claim 4, wherein said stop means (10) of said male element (21) are also designed to limit the angular travel of the nose pad (3) with respect to the nose pad holder (2) about the Y axis, preferably in a range of travel of around 45°.

6. Assembly according to claim 4, wherein said stop means (10) of said male element (21) are designed to also limit the angular travel of the nose pad (3) with respect to the nose pad holder (2) about the X axis, preferably in a range of travel of around 15°.

7. Assembly according to claim 4, wherein said stop means (10) of said male element (21) are designed to prevent the angular travel of the nose pad (3) with respect to the nose pad holder (2) about the X axis.

8. Assembly according to claim 1, wherein said stop means (10) of said male element (21) extend along a length greater than the diameter, or than the size along the Z axis of said male element (21), on either side of said male element (21).

9. Assembly according to claim 1, wherein said stop means (10) of said male element (21) have two opposite faces which extend mainly along the Z axis, and which form opposite stop surfaces, one of which limits the relative movement of the nose pad (3) about the Z axis with respect to the nose pad holder (2) in one direction and the other of which limits the relative movement of the nose pad (3) with respect to the nose pad holder (2) about the Z axis in the other direction.

10. Assembly according to claim 2, wherein said stop means (10) of the ball (21) comprise a part having the overall shape of a cylinder sector having an axis passing approximately through the centre of the sphere in which said connecting ball (21) is inscribed, said cylinder sector projecting from said connecting ball (21).

11. Assembly according to claim 1, wherein said male element (21) is provided on the nose pad holder (2) and the receiving housing (32) is provided on the nose pad (3).

12. Assembly according to claim 11, wherein the receiving housing (32) is provided on that face of the nose pad (3) that is opposite the nose support face (302), and has a groove (35) having an axis approximately parallel to the Y axis for the insertion of a portion of the arm (20) of the nose pad holder (2).

13. Assembly according to claim 12, wherein the receiving housing (32) is provided on that face of the nose pad (3) that is opposite the nose support face (302), and has a groove (36) having an axis approximately parallel to the Z axis so as to allow parts (34, 30) in relief of the receiving housing (32) to form stops complementary to said stop means (10) of said male element (21).

14. Assembly according to claim 1, wherein the nose pad (3) has, on the side of that face (304), known as the rear face, of the nose pad that is opposite the nose support face (302), a part in the form of an arch (40) which bounds, with the rear face (304) of the nose pad, said receiving housing (32), and a groove (35) is provided in a portion of said arch (40) in a direction approximately parallel to the Z axis and has a length greater than the length of the stop means (10) of said male element (21) so that said stop means (10) of said male element (21) can be guided during a relative movement about the Y axis of the nose pad (3) with respect to the nose pad holder (2).

15. Assembly according to claim 1, wherein each nose pad (3) comprises a part, known as the fitting part, which is made of an elastically deformable material, such as polycarbonate, for force-fitting said male element (21) into the receiving housing (32), and a part, known as the nose support part, which is intended to rest on a side of the wearer's nose, said part being made of a material having a hardness less than that of the fitting part.

16. Assembly according to claim 1, wherein the nose support face (302) of each nose pad (3) comprises a straight upper part (300) and a curved lower part (301) that extends said straight part.

17. Spectacle frame (7) having a face which comprises two lens locations (71) and a frame nosepiece (70) that connects the two lens locations (71), said frame (7) also having a nose support assembly which has two nose support elements (3), known as nose pads, and, for each nose pad, a mounting element (2), fixed to the frame nosepiece (70), for said nose pad, wherein said nose support assembly is in accordance with claim 1.

18. Frame according to claim 17, wherein said connecting means (1) are designed to allow each nose pad (3) to form, with an axis perpendicular to the face of the frame (7), a splay angle (B) that can vary in the range [1°; 45°].

19. Frame according to claim 17, wherein connecting means (1) are designed to allow each nose pad (3) to form, with the vertical axis of symmetry (S) of the frame (7), a frontal angle (A) that can vary in the range [10°; 50°].

20. Frame according to claim 18, wherein connecting means (1) are designed to allow each nose pad (3) to form, with the vertical axis of symmetry (S) of the frame (7), a frontal angle (A) that can vary in the range [10°; 50°].

* * * * *